(12) United States Patent
Lerum et al.

(10) Patent No.: US 9,092,298 B2
(45) Date of Patent: Jul. 28, 2015

(54) PACKAGING CONTENT UPDATES

(71) Applicant: Microsoft Corporation, Redmond, WA (US)

(72) Inventors: Cameron B. Lerum, Renton, WA (US); Catherine A. Wissink, Medina, WA (US); Roxanne M. Seubert, Bellevue, WA (US); Sushmita Subramanian, Redmond, WA (US); Vivek R. Rao, Redmond, WA (US); Yaron Hezroni, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/867,415

(22) Filed: Apr. 22, 2013

(65) Prior Publication Data

US 2014/0019956 A1  Jan. 16, 2014

Related U.S. Application Data (63) Continuation of application No. 11/707,655, filed on Feb. 15, 2007, now Pat. No. 8,429,626.

(51) Int. Cl.
*G06F 9/445* (2006.01)
*G06F 9/44* (2006.01)
*G06F 17/27* (2006.01)

(52) U.S. Cl.
CPC .. *G06F 8/65* (2013.01); *G06F 8/20* (2013.01); *G06F 8/60* (2013.01); *G06F 17/2785* (2013.01)

(58) Field of Classification Search
CPC ............... G06F 8/20; G06F 8/60; G06F 8/65; G06F 17/2785
See application file for complete search history.

(56) References Cited

U.S. PATENT DOCUMENTS

| 5,566,291 | A | 10/1996 | Boulton et al. |
|---|---|---|---|
| 6,182,275 | B1 | 1/2001 | Beelitz et al. |
| 6,205,579 | B1 | 3/2001 | Southgate |
| 6,530,039 | B1 * | 3/2003 | Yang .......................... 714/38.13 |
| 6,539,499 | B1 | 3/2003 | Stedman et al. |
| 6,615,376 | B1 | 9/2003 | Olin et al. |
| 6,671,659 | B2 | 12/2003 | Troia et al. |
| 6,721,748 | B1 | 4/2004 | Knight et al. |
| 6,950,814 | B2 * | 9/2005 | Bergan et al. ................... 706/55 |
| 6,954,755 | B2 | 10/2005 | Reisman |
| 7,124,409 | B2 * | 10/2006 | Davis et al. ................... 717/178 |
| 7,185,332 | B1 * | 2/2007 | Waldin et al. ................. 717/170 |

(Continued)

FOREIGN PATENT DOCUMENTS

| EP | 1564670 | 8/2005 |
|---|---|---|
| EP | 1603067 | 12/2005 |

OTHER PUBLICATIONS

Bird et al., NLTK: the natural language toolkit, Jul. 2004, 4 pages.*

(Continued)

*Primary Examiner* — Thuy Dao
(74) *Attorney, Agent, or Firm* — Kevin Sullivan; Kate Drakos; Micky Minhas (57) ABSTRACT

Aspects of the present disclosure are directed to obtaining user feedback and causing a package of content updates to be created and distributed based on the received feedback. In accordance with one embodiment, a method is provided for creating a package that contains one or more content updates that are configured for implementation on a remote device.

20 Claims, 4 Drawing Sheets

(56) References Cited

U.S. PATENT DOCUMENTS

| | | | |
|---|---|---|---|
| 7,212,624 B2 | 5/2007 | O'Connor | |
| 7,225,367 B2 | 5/2007 | Hashem et al. | |
| 7,228,524 B2 | 6/2007 | Bailey et al. | |
| 7,266,726 B1 | 9/2007 | Ladd et al. | |
| 7,571,092 B1 | 8/2009 | Nieh | |
| 7,681,186 B2 | 3/2010 | Chang et al. | |
| 8,055,907 B2* | 11/2011 | Deem et al. | 713/187 |
| 8,060,855 B2* | 11/2011 | Hegde et al. | 717/103 |
| 8,086,999 B2 | 12/2011 | Berstis et al. | |
| 8,112,744 B2 | 2/2012 | Geisinger | |
| 8,429,626 B2 | 4/2013 | Lerum et al. | |
| 8,713,544 B1* | 4/2014 | Sulton et al. | 717/143 |
| 2002/0104087 A1 | 8/2002 | Schaffer et al. | |
| 2002/0198784 A1 | 12/2002 | Shaak et al. | |
| 2003/0145317 A1* | 7/2003 | Chamberlain | 717/177 |
| 2004/0059703 A1 | 3/2004 | Chappell et al. | |
| 2004/0064472 A1 | 4/2004 | Oetringer et al. | |
| 2005/0097405 A1 | 5/2005 | Sesek et al. | |
| 2005/0097516 A1* | 5/2005 | Donnelly et al. | 717/124 |
| 2005/0154557 A1 | 7/2005 | Ebert | |
| 2005/0210015 A1 | 9/2005 | Zhou et al. | |
| 2005/0267919 A1 | 12/2005 | Pivar et al. | |
| 2006/0112152 A1* | 5/2006 | Napier et al. | 707/203 |
| 2006/0130026 A1 | 6/2006 | McHugh et al. | |
| 2006/0136907 A1 | 6/2006 | Bennett et al. | |
| 2006/0161800 A1 | 7/2006 | Dathathraya et al. | |
| 2007/0011651 A1 | 1/2007 | Wagner | |
| 2007/0101208 A1 | 5/2007 | Mohr | |
| 2007/0168922 A1* | 7/2007 | Kaiser | 717/104 |
| 2007/0226201 A1 | 9/2007 | Lerum et al. | |
| 2007/0271505 A1 | 11/2007 | Dandekar et al. | |
| 2008/0201703 A1 | 8/2008 | Lerum et al. | |
| 2008/0307400 A1 | 12/2008 | Dalal et al. | |
| 2010/0077475 A1* | 3/2010 | Deschenes et al. | 726/21 |
| 2010/0146491 A1* | 6/2010 | Hirano et al. | 717/137 |

OTHER PUBLICATIONS

Serrano et al., An adaptive package management system for scheme, Oct. 2007, 12 pages.*

"Advisory Action", U.S. Appl. No. 11/388,678, (Feb. 26, 2009), 3 pages.

"Check User Feedback", *HSE Web Depot*, n.d., retrieved from <http://www.hsewebdepot.org/imstool/GEMI.nsf/WEBDocs/CheckUserFeedback?OpenDocument> on Dec. 20, 2005, 2 pages.

"Final Office Action", U.S. Appl. No. 11/388,678, (Oct. 20, 2009), 10 pages.

"Final Office Action", U.S. Appl. No. 11/388,678, (Nov. 19, 2008), 10 pages.

"Final Office Action", U.S. Appl. No. 11/707,655, (Nov. 17, 2011), 12 pages.

"Final Office Action", U.S. Appl. No. 11/707,655, (Mar. 29, 2011), 12 pages.

"Hosted Survey", *1999-2004 Hostedware Corporation*, retrieved from <http://www.hostedsurvey.com/home.html> on Dec. 20, 2005, 3 pages.

"Non Final Office Action", U.S. Appl. No. 11/388,678, (Feb. 1, 2008), 9 pages.

"Non Final Office Action", U.S. Appl. No. 11/388,678, (Jun. 24, 2008), 9 pages.

"Non Final Office Action", U.S. Appl. No. 11/388,678, (Jun. 3, 2009), 9 pages.

"Non-Final Office Action", U.S. Appl. No. 11/707,655, (07/01/11), 10 pages.

"Non-Final Office Action", U.S. Appl. No. 11/707,655, (Dec. 3, 2010), 10 pages.

"Notice of Allowance", U.S. Appl. No. 11/707,655, (Dec. 26, 2012), 10 pages.

"User Testing", *2005 Microsoft*, retrieved from <http://www.bcentral.co.uk/technology/companywebsite/website-user-testing.mspx> on Dec. 20, 2005, 3 pages.

Bird, Steven et al., "NLTK: The Natural Language Toolkit", http://delivery.acm.org/10.1145.1220000/1219075/a31-bird.pdf, (Jul. 2004), 4 pages.

Enerson, Meryl "Getting User Feedback: Better, Quicker, and Cheaper?", SoftwareMag.com, retrieved from <http://www.softwaremag.com/L.cfm?Doc=2004-10/2004-10usability> on Dec. 20, 2005,(Oct. 2004), 3 pages.

Light, Marc et al., "Web-based Interfaces for Natural Language Processing Tools", *Proceedings of the Second ACL Workshop on Effective Tools and Methodologies for Teaching NLP and CL*, (Jun. 2005), pp. 28-31.

* cited by examiner

PACKAGING CONTENT UPDATES

RELATED APPLICATION

This application is a continuation of and claims priority under 35 U.S.C. §120 to U.S. application Ser. No. 11/707,655, filed on Feb. 15, 2007, the disclosure of which is incorporated by reference herein in its entirety.

BACKGROUND

The constant progress of computer systems, particularly the explosion of the Internet and intranet networks, has resulted in the development of a new information era. With a single personal computer, a user may employ computer programs that perform a variety of tasks and provide access to a wide range of resources, information, and services. Moreover, software vendors and other content providers are increasingly able to obtain information from users over computer networks that describe the functionality and/or content in a program.

Many software vendors develop computer programs that contribute to the constant progress of computer systems. Those skilled in the art and others will recognize that computer programs are typically designed for users who employ a particular language and/or maintain a common background. Increasingly, computer programs that are designed for one group of users are modified to service the needs of users who employ a different language and/or have a different background. In this example, programs may include user interfaces and/or content in a variety of languages and/or formats. When user preferences are identified, a program or operating environment may be localized to a language/format that is configured for the intended recipient. Similarly, content, such as Web pages, may also be translated into a variety of formats to service different users.

Software vendors and other content providers may produce content that is inaccurate, formatted incorrectly, or inappropriate for a group of intended users. For example, under the present system in which programs are created for a first group of users and then modified to service the needs of other groups of users, the modification process exposes a program to several potential error sources. Also, software services are increasingly being used that automate the process of translating content between different languages. For example, a user viewing a Web page in one language may cause a software service to translate the Web page into a different language and have the translation displayed. However, modifying program content by, for example, performing a translation between different languages is a complex task that may not be performed accurately in all instances.

Systems have been implemented that allow developers to obtain feedback from a computer user in a networking environment. In this regard, as a user interacts with a program, a graphically based object may be invoked that allows the user to automatically provide feedback about an issue encountered in the program. For example, a user may provide feedback to identify an incorrect translation of a term displayed on a menu. In these types of systems, feedback from a plurality of users may be collected at a centralized computer system. Based on the collected feedback, developers may provide updates to correct an error or other inappropriate content identified by one or more users. However, in order for an error correction to be implemented, users must wait until a software update is made available by developers. Unfortunately, developers may be slow in providing software updates or may never provide a software update that corrects the error.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Aspects of the present disclosure are directed at obtaining user feedback and causing a package of content updates to be created and distributed based on the received feedback. In accordance with one embodiment, a method is provided for creating a package that contains one or more content updates configured to change the content that is presented when a program executes. More specifically, the method includes obtaining input that describes one or more content updates. In this regard, the input received may include the user-defined content that will be displayed when the program executes and the identity of the content displayed by default. Then, the method assembles selected content updates into a package that is suitable for transmission over a network connection. When the package is assembled, processing is provided that allows the content updates in the package to be implemented on a remote computing device.

DESCRIPTION OF THE DRAWINGS

The foregoing aspects of the embodiments described herein will become more readily appreciated as the same become better understood by reference to the following detailed description, when taken in conjunction with the accompanying drawings, wherein.

DETAILED DESCRIPTION

Prior to discussing the details of the present disclosure, it should be understood that the following description is presented largely in terms of logic and operations that may be performed by conventional computer components. These computer components, which may be grouped in a single location or distributed over a wide area, generally include computer processors, memory storage devices, display devices, input devices, etc. In circumstances where the computer components are distributed, the computer components are accessible to each other via communication links.

Although embodiments will be described with relation to illustrative routines and operating environments, one skilled in the relevant art will appreciate that the disclosed embodiments are illustrative in nature and should not be construed as limiting. In any event, the following description first provides a discussion of an environment and system in which aspects of one or more embodiments may be implemented. Then illustrative routines that may implement aspects of the various embodiments are described. The examples provided herein are not intended to be exhaustive or to limit aspects of the disclosure to the precise forms disclosed. Similarly, any steps described herein may be interchangeable with other steps or combinations of steps in order to achieve the same result.

Figure 1:
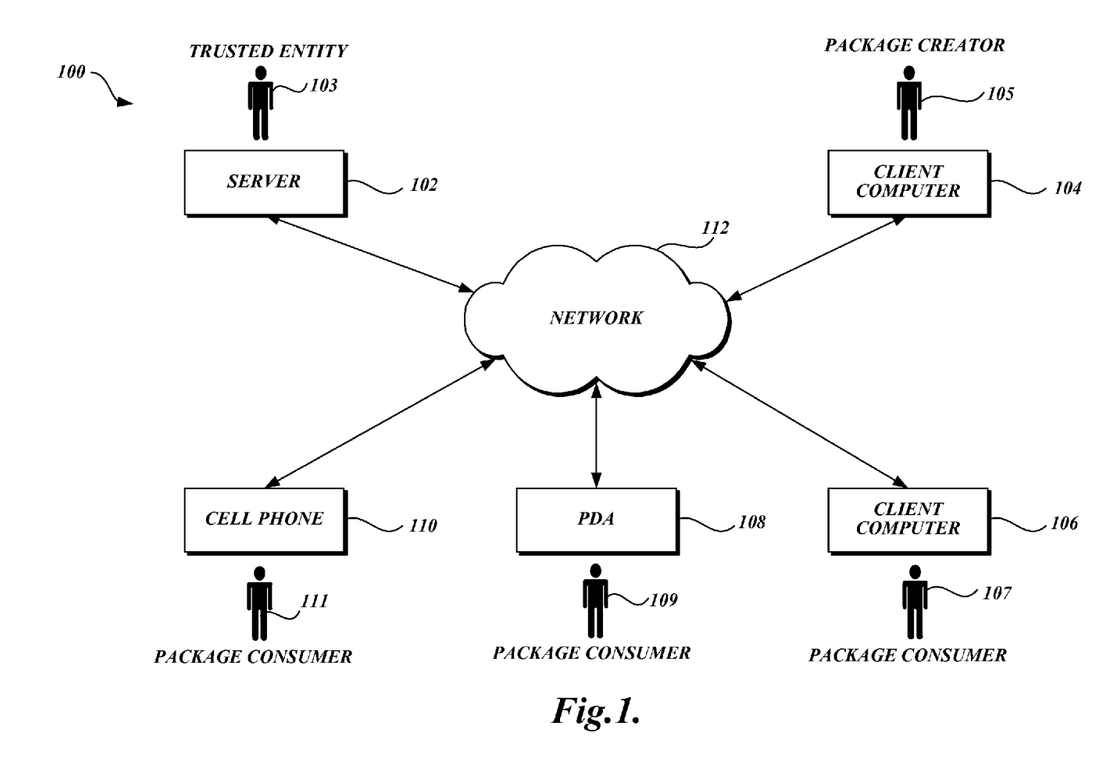
FIG. 1 illustrates a networking environment in which aspects of packaging content updates may be implemented.

With reference to FIG. 1, a networking environment 100 in which aspects of the present disclosure may be implemented will be described. As illustrated in FIG. 1, the networking environment 100 is comprised of a plurality of computing devices, namely, the server 102 (associated with the trusted entity 103), the client computer 104 (associated with the package creator 105), the client computer 106 (associated with the package consumer 107), the personal digital assistant ("PDA") 108 (associated with the package consumer 109), and the cell phone 110 (associated with the package consumer 111). Each of the devices illustrated in FIG. 1 are each communicatively connected via the network 112. Those skilled in the art and others will recognize that the network 112 may be implemented as a local area network ("LAN"), wide area network ("WAN"), cellular network, IEEE 802.11, Bluetooth wireless networks, and the like. Typically, the network 112 will be the global network commonly known as the Internet or World Wide Web ("WWW"). However, those skilled in the art and others will recognize that aspects of the present disclosure may also be implemented in other interactive environments, such as local or wide area networks.

As mentioned previously, systems have been implemented for obtaining feedback from users in the networking environment 100 depicted in FIG. 1. Developers may use the feedback to create an update to correct an error and/or change inappropriate content identified by a user. In this regard, a program executed on the computing devices 106-110 may be configured with a GUI object that provides a mechanism for obtaining input from the user. For example, a user may activate the GUI object and thereafter provide input identifying an incorrect translation of a natural language term displayed in the program. In some instances, a user may not only provide input to indicate that a natural language term was incorrectly translated but may also provide a correct translation. When this type of input is obtained, the input may be reported to a trusted entity. For example, a user associated with the client computer 106 may cause input that describes an incorrect translation to be transmitted to the server 102 where the data is accessible to the trusted entity 103. In this instance, input obtained from a plurality of users is aggregated at a central location that is accessible to developers.

Generally described, aspects of the present disclosure allow users to create and distribute a package of content updates without having to rely on software providers. In one embodiment, existing systems are leveraged to collect data about one or more issues that a user encounters while interacting with a program. For example, the package creator 105 depicted in FIG. 1 may identify a natural language translation error while interacting with a program on the client computer 104. As mentioned previously, existing systems may configure the program to present a GUI object from which the user may input a set of data that includes a correction to the translation error. Instead of the data input by the user only being reported to the trusted entity 103, aspects of the present disclosure also store the data in a data store that is accessible to the package creator 105. From the data in the store, a user may create a package of content updates.

In one embodiment, the package creator 105 may selectively identify content updates that are represented in a data store. All of the content updates selected by the package creator 105 may be assembled into a "package" for distribution to other users, such as the package consumers 107, 109, and 111. In this regard, a package consumer may install the package to implement the content updates provided by the package creator 105 on an associated computing device.

As will be appreciated by those skilled in the art and others, FIG. 1 provides a simplified example of one networking environment 100 suitable for implementing aspects of the present disclosure. In other embodiments, the functions and features of the computing devices shown may be implemented using a greater number of devices or reduced to a single device and thus not require network protocols for communicating between combined systems.

Figure 2:
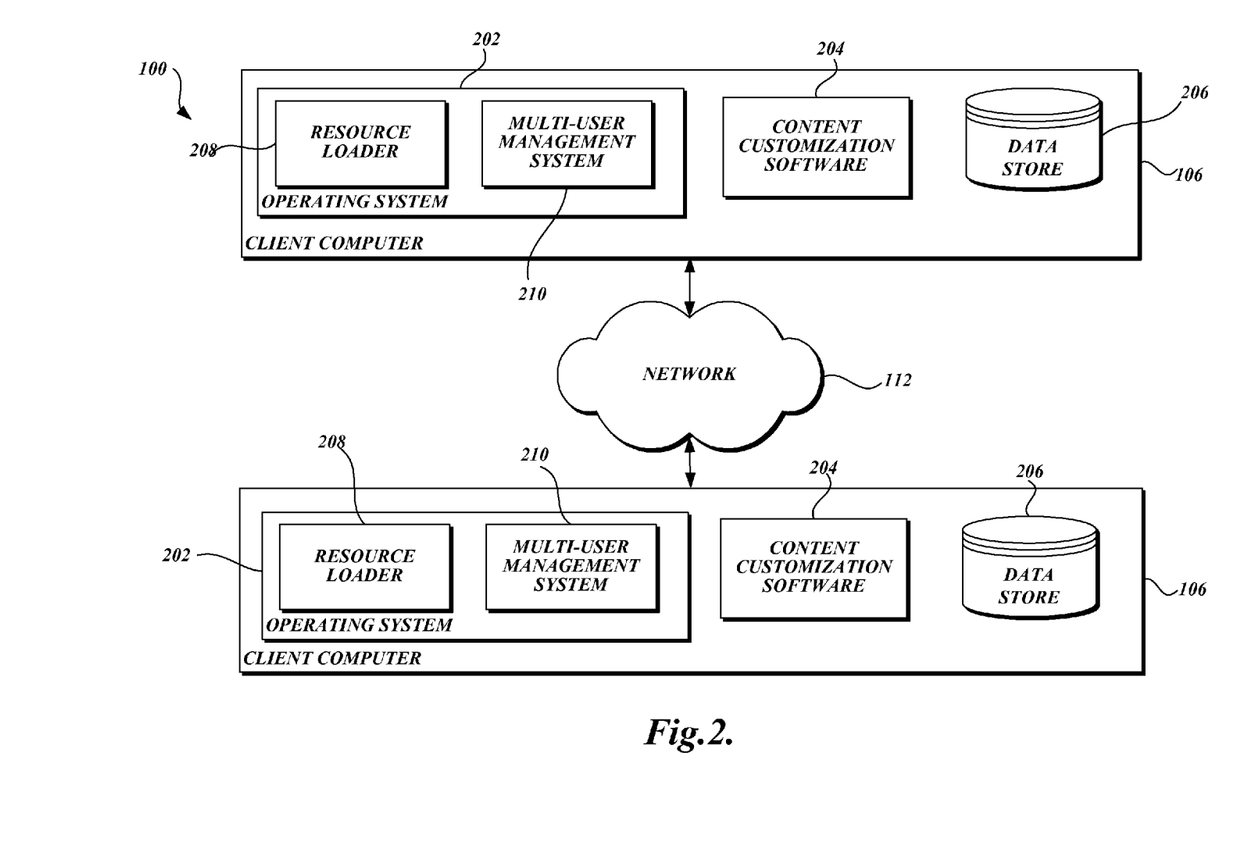
FIG. 2 illustrates components of computing devices in the networking environment depicted in FIG. 1.

Now with reference to FIG. 2, exemplary computer architectures for the client computers 104 and 106, also depicted in FIG. 1, will be described. For ease of illustration and because it is not important for an understanding of the claimed subject matter, FIG. 2 does not show the typical components of many computers, such as a CPU, keyboard, a mouse, a printer, or other I/O devices, a display, etc. However, as illustrated in FIG. 2, the client computers 104-106 each include an operating system 202, content customization software 204, and a data store 206. In this illustrative embodiment, the operating system 202 includes a resource loader 208 and a multi-user management system 210.

As illustrated in FIG. 2, the client computers 104 and 106 each include the operating system 202 that may be a general-purpose operating system, such as a Microsoft® operating system, UNIX® operating system, or Linux® operating system. Alternatively, the operating system 202 may be a specialized operating system designed specifically for a computer that maintains non-generic hardware. In any event, the operating system 202 controls the general operation of the computers 104-106 and is responsible for executing programs. Moreover, the operating system 202 provides services to programs installed on the computer that typically include certain core services including, but not limited to, input/output, memory management, process scheduling, and the like. Since these aspects of the operating system 202 are not important for an understanding of the present disclosure, they will not be described in additional detail here.

Generally described, the content customization software 204 has traditionally provided a way for developers to obtain input that describes an issue with content encountered in a program. In this regard, the content customization software 204 provides functionality to collect data that describes a correction to an issue. Aspects of the present disclosure may be implemented in conjunction with the content customization software 204 for the purpose of creating and distributing a package of content updates. For example, data input by a user into the content customization software 204 may be stored in the data store 206. Then, aspects of the present disclosure allow a user to create a package of content updates for distribution to other users. In this regard, the data store 206 may be on a local device. Alternatively, the data store 206 may be accessed remotely over a network connection.

Systems have been developed that allow program content to vary between different groups of users. For example, developers may create multilingual user interface programs in which code that implements the functionality of the program is separated from the natural language content that is displayed on the user interface. In this type of system, the same code is used to implement the functionality of the program regardless of the user's preferred language. However, underlying "resources" that display content vary, depending on the user's preferred language. Frequently, developers will create resource-only dynamically linked libraries ("DLLs") that reference the localized content of a target language. If the user's preferred language is English, the resource-only DLL that references resources with content in the English-language is used during program execution. Similarly, if the user's preferred language is French, the resource-only DLL that references resources with content in the French language is used during program execution. In this way, multilingual programs may be readily developed that, for example, present program content such as natural language that describes menu items (e.g., "file," "edit," "insert," and the like) in the user's preferred language.

Those skilled in the art and others will recognize that the resource loader 208 of the operating system 202 is responsible for identifying resources that will display the appropriate program content. In one embodiment of the present disclosure, functionality is implemented that causes the resource loader 208 to query the data store 206 to identify the appropriate resources to load when a program is executed. Stated differently, instead of loading default resources, aspects of the present disclosure may cause the resource loader 208 to load one or more user-defined resources that display content obtained using the content customization software 204. For example, while using a word processing program a user may provide input indicating that a menu item entitled "Help" should be entitled "Troubleshooting." The content customization software 204 causes data that describes this issue to be stored in the data store 206. When the word processing program is executed, the resource loader 208 queries the data store 206 to identify user-defined resources for the program. In this instance, a user-defined resource is loaded by the resource loader 208 and the content associated with this resource (e.g. "Troubleshooting") is displayed as the word processing program is executed.

In the embodiment illustrated in FIG. 2, the operating system 202 includes a multi-user management system 210 that allows multiple users to share computer resources. Those skilled in the art and others will recognize that the multi-user management system 210 provides processing that allows a computing device to serve multiple users; each user having a different user profile that defines a computer configuration with regard to that user. In this type of system, the multi-user management system 210 tracks which users, or groups of users may access particular computer resources. In one embodiment, a package of content updates may be readily shared between a group of users in this type of multi-user environment. In this regard, a user may "opt-in" to automatically have packages of content updates implemented based on the "group" that the user belongs.

Now with reference to FIG. 3, an exemplary embodiment of a package creation routine 300 configured to create a package of content updates that may be distributed to other users will be described.

Figure 3:
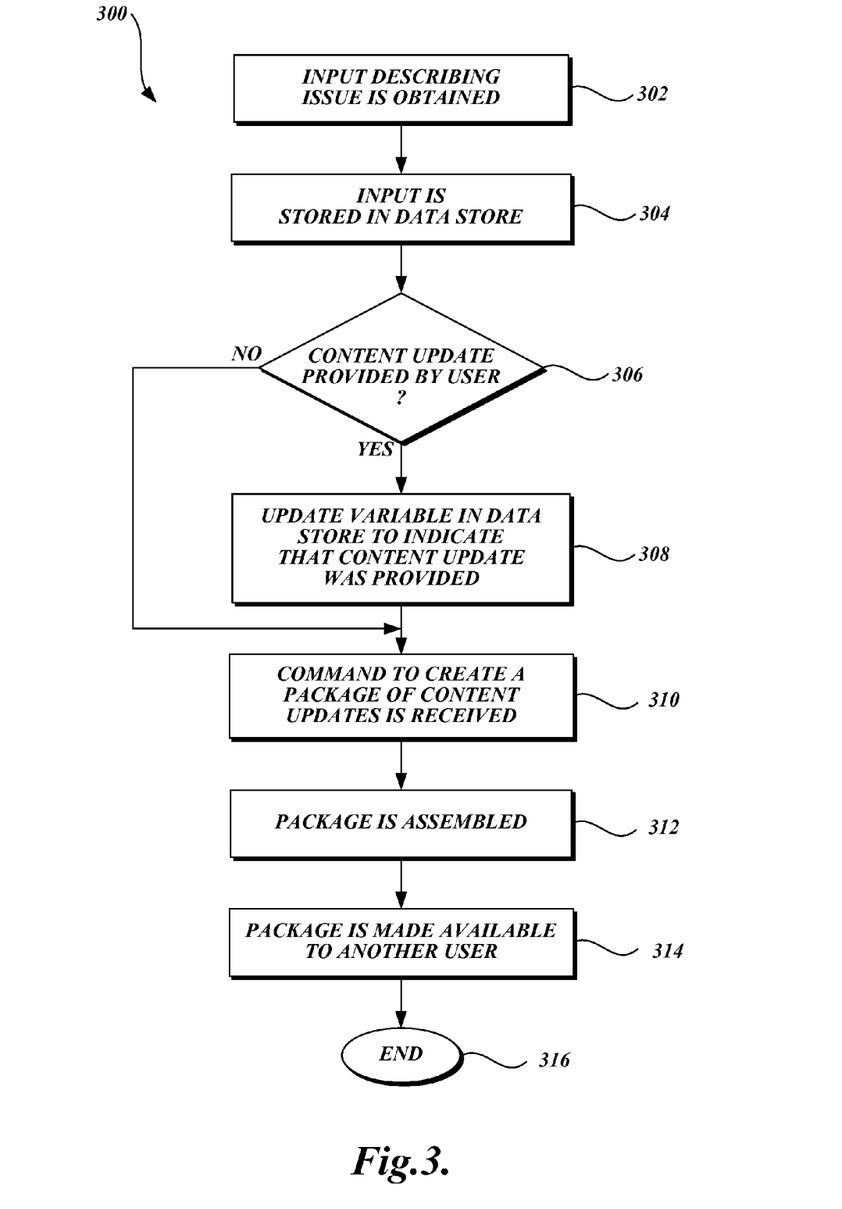
FIG. 3 illustrates an exemplary package creation routine for creating a package of content updates that may be distributed to remote computing devices.

As illustrated in FIG. 3, the package creation routine 300 begins at block 302 where input that describes an issue with program content is obtained. As mentioned previously, a program developer may include a GUI object on the user interface of a program in order to obtain input from the user. Among other things, the GUI object provides mechanisms that allow a user to (1) select natural language content that will be updated, and (2) provide input that will replace the selected content. A detailed description of an associated system that may be used to obtain input from the user, at block 302, is found in commonly assigned, co-pending U.S. patent application Ser. No. 11/388,678, titled "OBTAINING USER FEEDBACK IN A NETWORKING ENVIRONMENT," filed Mar. 24, 2006, the content of which is expressly incorporated herein by reference.

At block 304, the input obtained from the user at block 302 is stored in a data store accessible to the user who provided input at block 302. Since processing that may cause data to be stored in a data store is generally known in the art, a detailed description of the processing performed at block 304 will not be provided here.

As illustrated in FIG. 3, at decision block 306, a determination is made regarding whether the issue identified at block 302 includes a content update to the identified issue. In some instances, input obtained from the user does not include a content update that will change the content that is displayed by a program. For example, a user may indicate that natural language content displayed in a program is inappropriate and cause this feedback to be reported to a trusted entity. In other instances, a user may identify inappropriate program content and provide an update to the content. By way of example only, a program icon may display an image that the user considers inappropriate. In some instances, the user may merely report that the image on the icon is inappropriate. Alternatively, if a user finds the image inappropriate, a different image may be identified to replace the image displayed on the icon by default.

In any event, if a determination is made at block 306 that a content update was not provided, the package creation routine 300 proceeds to block 310, described in further detail below. Conversely, if input indicative of a content update was obtained, the package creation routine 300 proceeds to block 308 where a variable in the local data store 206 is updated to reflect that the current issue includes a content update. As described in further detail below with reference to FIG. 4, content input by the user will be identified and displayed when an associated program is executed.

In the illustrative embodiment illustrated in FIG. 3, a command to create a package of content updates that may be distributed over a computer network is received, at block 310. As mentioned previously, content customization software 204 (FIG. 2) implemented by aspects of the present disclosure obtains input that describes various issues encountered by the user.

Data that describes an issue is stored as entries in a data store that is accessible to the user. In accordance with one embodiment, a user may generate a command to create a package of content updates by interacting with the user interface provided by the content customization software 204. In this regard, the user may select between content updates that will be included in the package when the command is generated.

At block 312, a package with one or more content updates is assembled. As mentioned previously, user-defined content updates are stored in entries in the data store 206. In response to receiving the command at block 310, data that defines the selected content updates is extracted from the data store 206. In addition to content updates, data obtained from the data store 206 may include rules which prescribe the conditions under which content updates will be installed. In one embodiment, this data is formatted in accordance with the Xtensible Markup Language ("XML"). However, those skilled in the art and others will recognize that data in the package being created may be formatted using other protocols suitable for network communication without departing from the scope of the claimed subject matter.

At block 314, the package of updates assembled at block 312 is made available to another user. In accordance with one embodiment, a package of content updates may be made available from a publicly accessible network location such as a Web site and/or FTP share. Also, the package of content updates may be automatically shared between an associated group of users. For example, as described previously, the multi-user management system 210 (FIG. 2) may be used to share a package between a group of users. Then, the package creation routine 300 proceeds to block 316, where it terminates.

Embodiments of the present disclosure are not limited to the illustrative embodiment of the package creation routine 300 depicted in FIG. 3. In some instances, additional/fewer steps than those depicted in FIG. 3 may be performed or steps may be performed in a different order without departing from the scope of the claimed subject matter. For example, the processing that occurs at blocks 302-308 will repeat each time an issue is identified by a user. Thus, the package creation routine 300 depicted in FIG. 3 provides just one example of the manner in which an embodiment of the disclosure may be implemented.

Now with reference to FIG. 4, an exemplary embodiment of a package consumption routine 400 will be described that is configured to implement content updates on a user's computer. More specifically, the package consumption routine 400 is configured to implement content updates that are represented in a package created using the package creation routine 300 (FIG. 3).

Figure 4:
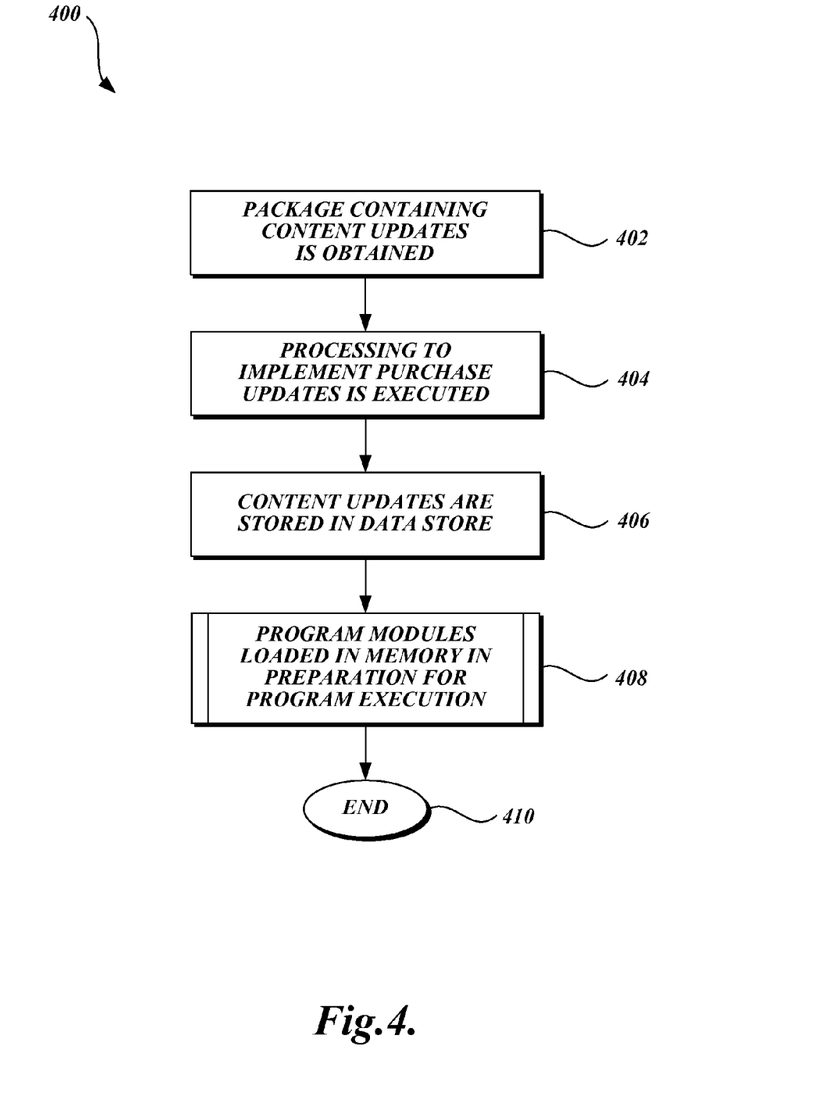
FIG. 4 illustrates an exemplary package consumption routine configured to cause a package of content updates to be implemented on a computer in accordance with one or more embodiments.

As illustrated in FIG. 4, the package consumption routine 400 begins at block 402 where a package containing one or more content updates is obtained. As described previously, a package of content updates may be accessed from a network location such as a Web site and/or FTP share. Also, the package may be automatically shared between an associated group of users. In this instance, the package of content updates is obtained automatically, at block 402.

As illustrated in FIG. 4, processing to implement one or more content updates represented in the package obtained at block 402 is executed. In accordance with one embodiment, XML formatted data in the package is parsed in order to identify processing that will be performed to implement the content updates. The processing that is executed may include, but is not limited to, updating system settings, configuration databases, and the like.

At block 406, content updates represented in the package are stored in a data store that contains all of the updates implemented by the current user. Each computing device that implements aspects described herein may access a data store that manages all of a user's content updates. In this regard, content updates in the package received at block 402 are added to the user's data store so that the appropriate resources are loaded when programs associated with content updates are executed.

In the illustrative embodiment depicted in FIG. 4, a program configured to display content that has been updated is loaded in memory at block 408 in preparation for execution. Those skilled in the art and others will recognize that a component of the computer operating system is responsible for loading program modules into memory. As described previously, a component of a computer operating system known as a resource loader 208 is modified by aspects of the present disclosure. In one embodiment, functionality is implemented that causes the resource loader 208 to query the data store 206 to determine whether a resource for displaying content from a content update should be used when executing a program. When a program is associated with one or more content updates, the resource loader 208 causes the resource that implements the appropriate content updates to be used during program execution. Then, the package consumption routine 400 proceeds to block 410, where it terminates.

While illustrative embodiments have been illustrated and described, it will be appreciated that various changes can be made therein without departing from the spirit and scope of the present disclosure.

What is claimed is:

1. A computer-implemented method comprising:
   receiving, via a network interface, user input from a plurality of computing devices on which respective instances of a program execute, the user input identifying natural language content of the program to update and defining content updates of user-defined natural language content that is configured to replace the identified natural language content;
   storing, in a data store, the user input identifying natural language content of the program to update and defining the content updates of user-defined natural language content;
   determining which of the content updates stored in the data store correspond with the identified natural language content to update;
   assembling one or more content updates that correspond with the identified natural language content into a package that is suitable for transmission over the network; and
   transmitting, via the network interface, the package of content updates to another computing device on which another instance of the program executes effective to cause the program executing on the other computing device to implement the one or more content updates effective to replace the identified natural language content with the user-defined natural language content.

2. The computer-implemented method as recited in claim 1, wherein the user input received from one of the plurality of computing devices indicates that the identified natural language content is inappropriate.

3. The computer-implemented method as recited in claim 2, wherein determining which of the content updates correspond with the identified natural language content to update comprises querying the data store based on the user input that identifies the issue associated with the program.

4. The computer-implemented method as recited in claim 1, wherein the assembling of the one or more content updates is responsive to a command received from one of the plurality of devices on which an instance of the program executes.

5. The computer-implemented method as recited in claim 1, wherein assembling the one or more content updates into the package includes providing rules prescribing conditions under which to implement the one or more content updates on the other computing device.

6. The computer-implemented method as recited in claim 5, wherein the rules prescribing conditions under which to implement the one or more content updates are formatted in extensible markup language (XML).

7. The computer-implemented method as recited in claim 1, wherein assembling the one or more content updates into the package includes providing logic for implementing the one or more content updates on the other computing device.

8. The computer-implemented method as recited in claim 7, wherein the logic for implementing the one or more content updates is formatted in extensible markup language (XML).

9. A device comprising:
   a network interface configured to enable communication with computing devices via a network, the network interface implemented at least partially in hardware; and
   a content package creator stored in a computer-readable storage memory and configured to perform operations comprising:

receiving, via the network interface, user input from a plurality of the computing devices on which respective instances of a program execute, the user input identifying natural language content of the program to update and defining content updates of user-defined natural language content that is configured to replace the identified natural language content;

storing, in a data store, the user input identifying natural language content of the program to update and defining the content updates of user-defined natural language content;

determining which of the content updates stored in the data store correspond with the identified natural language content to update;

assembling, one or more of the content updates that correspond with the identified natural language content into a package that is suitable for transmission over the network, the package including logic effective to implement the one or more content updates on another of the computing devices that executes another instance of the program; and transmitting, via the network interface, the package of content updates to the other computing device on which the other instance of the program executes effective to implement the one or more content updates to replace, on the other computing device, the identified natural language content with the user-defined natural language content.

10. The device as recited in claim 9, wherein assembling the one or more content updates into the package includes providing logic for implementing the one or more content updates on the other computing device.

11. The device as recited in claim 10, wherein the logic for implementing the one or more content updates is formatted in extensible markup language (XML).

12. The device as recited in claim 9, wherein the content package creator is further configured to assemble the package of content updates without user interaction or transmit the package of content updates without user interaction.

13. The device as recited in claim 9, wherein the package of content updates is assembled such that the one or more content updates can be implemented without a software update that modifies functionality of the program.

14. The device as recited in claim 9, wherein the user input defining the one or more content updates for the program is obtained through a plurality of respective graphical user interface (GUI) objects executing on the plurality of the computing devices.

15. The device as recited in claim 9, wherein at least one of the content updates is implemented as resource-only dynamic link library (DLL).

16. A computer-readable storage memory comprising instructions that, responsive to execution by one or more processors, implement a content package creator to perform operations comprising:
receiving, via a network interface, user input from a plurality of computing devices on which respective instances of a program execute, the user input identifying natural language content of the program to update and defining content updates of user-defined natural language content that is configured to replace the identified natural language content;

storing, in a data store, the user input identifying natural language content of the program to update and defining the content updates of user-defined natural language content;

determining which of the content updates stored in the data store correspond with the identified natural language content to update;

assembling one or more content updates that correspond with the identified natural language content into a package that is suitable for transmission over the network, the package including logic effective to implement the one or more content updates on another computing device that executes another instance of the program; and transmitting, via the network interface, the package of content updates to the other computing device on which the other instance of the program executes effective to implement the one or more content updates to replace, on the other computing device, the identified natural language content with the user-defined natural language content.

17. The computer-readable storage memory as recited in claim 16, wherein the user input received from one of the plurality of computing devices identifies the issue associated with the program.

18. The computer-readable storage memory as recited in claim 16, wherein the package of content updates includes natural language content that, responsive to implementation on the other computing device, causes the program to load the natural language content in place of default content of the program.

19. The computer-readable storage memory as recited in claim 16, wherein assembling the one or more content updates into the package includes providing logic for implementing the one or more content updates on the other computing device.

20. The computer-readable storage memory as recited in claim 16, wherein assembling the package of content updates or transmitting the package of content updates is performed without user interaction.

* * * * *